June 4, 1957  H. ALKEMA  2,794,593
"GREAT CIRCLE" DISK COMPUTER
Filed Feb. 3, 1954  2 Sheets-Sheet 1

INVENTOR.
H. Alkema

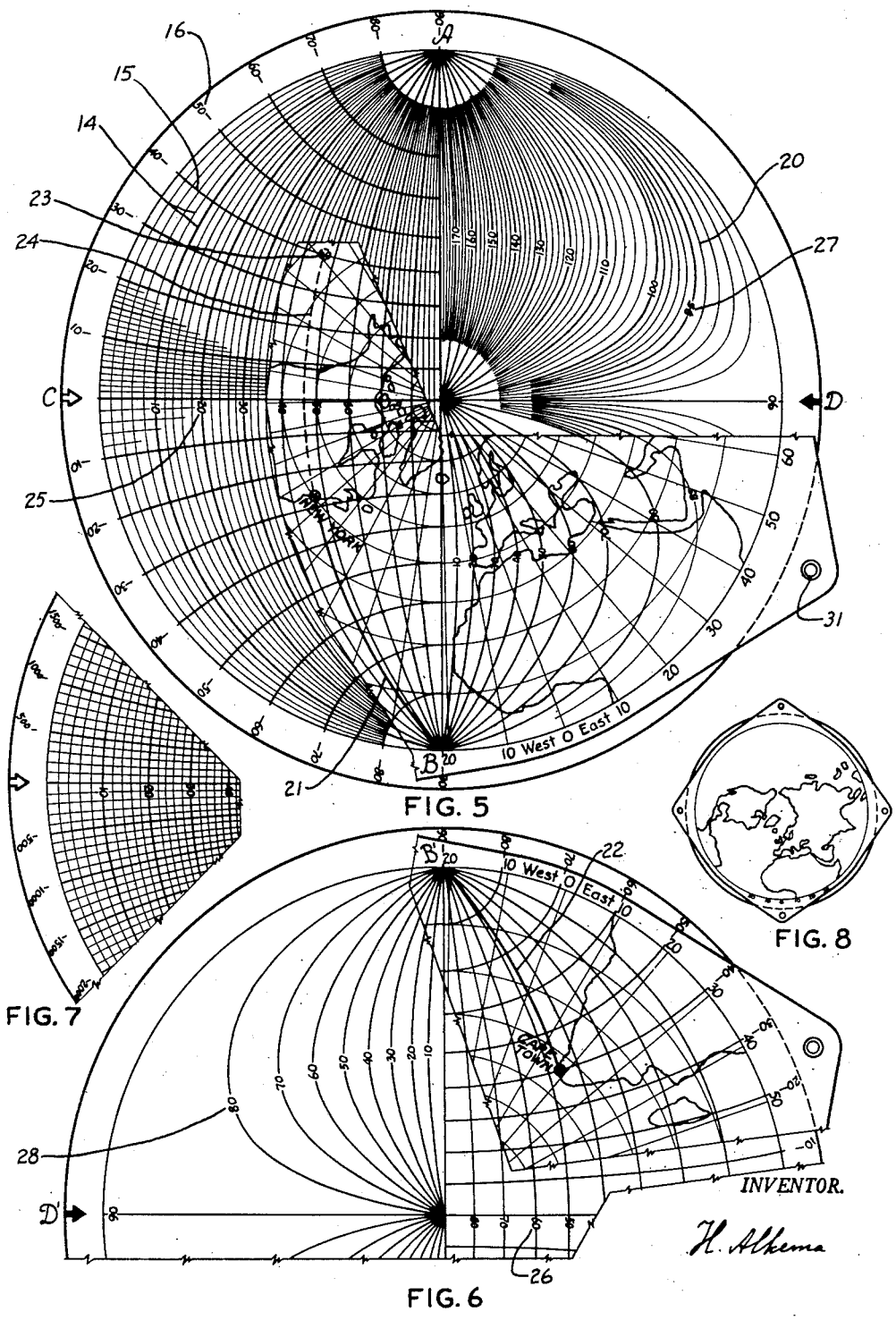

United States Patent Office 2,794,593
Patented June 4, 1957

2,794,593

"GREAT CIRCLE" DISK COMPUTER

Hendrik Alkema, Baltimore, Md.

Application February 3, 1954, Serial No. 407,839

11 Claims. (Cl. 235—61)

This invention relates to a device for determining the shortest (or great circle) distance between any two points on earth, and the varying course to be steered to follow this great circle.

The problem of great circle sailing, which, in essence, is the solution of a spherical triangle on the earth's surface, is usually accomplished by computation, according to mathematical formulas and with the help of mathematical tables, or by the use of certain maps, for instance those drawn on the gnomonic projection. Such solutions require time and can be executed only by persons who have had the necessary training in navigation.

A number of graphical charts and devices for solving this problem have been developed. One such typical device, called the celestial coordinator (or coordinate transformer), consists essentially of two meridional projections of the celestial sphere, rotatable the one over the other. Since this device is capable of solving the spherical triangle graphically it is therefore adaptable to the solution of great circle problems. When so used it will give the great circle distance as well as the initial compass course. More is required to be known, however, since it is necessary, at regular intervals, that the course be changed. It thus becomes necessary to repeat the graphical solution as many times as it is necessary to change the compass course along the route. This repetitious procedure is a disadvantage of this method. A second disadvantage is the fact that it cannot immediately be determined over what areas of the earth's surface the route leads, whether over land or sea, for instance. Finally, the whole procedure is a somewhat theoretical one, and the reliability of the results depends, to a great extent, on how thoroughly the person using the device understands its basic principles. Arithmetical errors, moreover, probably remain undetected. Visual checks are out of the question. The value of the celestial coordinator as a teaching aid results from the necessity for the student fully to understand the theory underlying it but, conversely, this necessity is not desirable when the instrument is used for practical navigation. Other devices in the present state of the art are similarly cumbersome.

The general object of the present invention is a device for determination of great circle courses and distances, which is easily understood and which is simple in its operation. One, also, that requires a minimum of repetition, that will make visible map particulars of the portion of the earth's surface covered by the route, that will reduce chances for arithmetical errors to a minimum, and that will make visual checks possible.

The specific object is a device comprising two transparent maps, one of each hemisphere, on which as a first step the points of departure and destination can be directly and conveniently plotted; then as the second step, the location of the route is easily accomplished by rotating the disk, situated between the maps, until one of the curves occurring on it passes through the two plotted geographical points, whether or not these lie on the same map, at which instant the distance between them may be read off; then, lastly, by one more simple operation, the compass course becomes directly readable, not only at the point of departure but at any point along the great circle route. This determination of the true compass course at any point on the great circle is unique to this device.

A further object is a device that is especially useful in aerial navigation and, in general, in all cases where it is necessary quickly to determine course and distance with a minimum chance of error.

A further object is a device that can be used anywhere on earth and is particularly useful in planning a trip when alternate routes are considered.

A further object is a device that will give directly the geographical position of the vertex, as well as the great circle distance from start to vertex and from vertex to destination.

A still further object is a device that is flat and of convenient size, and which can be manufactured inexpensively.

In the drawings:

Fig. 5 is a view of the north side of the device with the transparent maps partially cut away.

Fig. 6 is a view of the south side of the device with the rotatable disk positioned as in Fig. 5, showing together with Fig. 5 the whole great circle route New York—Capetown.

Fig. 7 is a partial view of the rotatable disk with distances given in nautical miles instead of degrees.

Fig. 8 is a view of the device with the zero meridian in the diagonal position.

Figures 1, 3, 4:
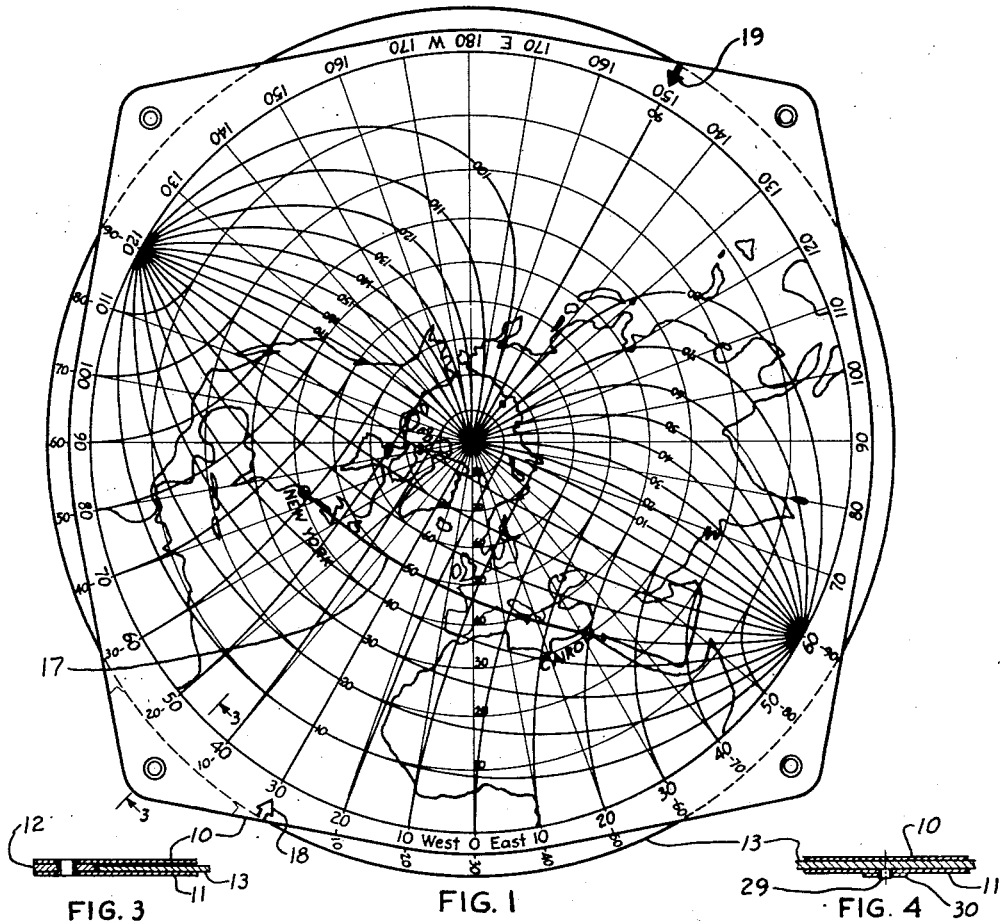
Fig. 1 is a view of the north side of the device, showing the great circle route traced between New York and Cairo, and demonstrating how the distance is determined.
Fig. 3 is a section taken along line 3—3 of Fig. 1.
Fig. 4 is a section taken near the center of the device, showing an optional pivotal mounting.

Map 10 is a transparent sheet having a polar stereographic projection of the northern hemisphere. Map 11 is also transparent and has a similar projection of the southern hemisphere. At the four corners they are permanently fastened together by means of spacers 12 (Fig. 3), which keep the transparent sheets 10 and 11 the right distance apart while allowing an opaque circular disk 13 to rotate freely between them. Rotatable disk 13 is imprinted with various sets of curves on both sides, which may be best explained with reference to Fig. 5. Each side is divided into two halves by diameter AB. Area ABC is provided with two sets of curves. Curves 14 represent great circles running from A to B in conformity with the projection used. They are symmetrical about the radial line at C, or the line of vertices. Each great circle may be readily designated, as shown, by the latitude of its vertex. Great circles are here drawn at two degree intervals, every fifth being made heavier and designated 10°, 20° etc. Intersecting the set of curves 14 is another set of curves 15 indicating the distance along the great circles measured from their vertices. Distances 16 are read off in the margin and are here shown expressed in degrees.

The device is operated as follows: Let it be required to locate the great circle track and to determine the distance between New York and Cairo. Disk 13 is rotated until one of the curves 14 passes through the two points, which curve is thereupon traced on the map in a pencil line 17 (see Fig. 1).

To determine the distance two readings are taken from the distance curves, in this case 62° for New York and 20° for Cairo, making 82° in total, or 82×60=4920 nautical miles. The great circle reaches its vertex at 50° north latitude and at 30° west longitude, indicated by the white arrow 18 (Fig. 1).

Figure 2:
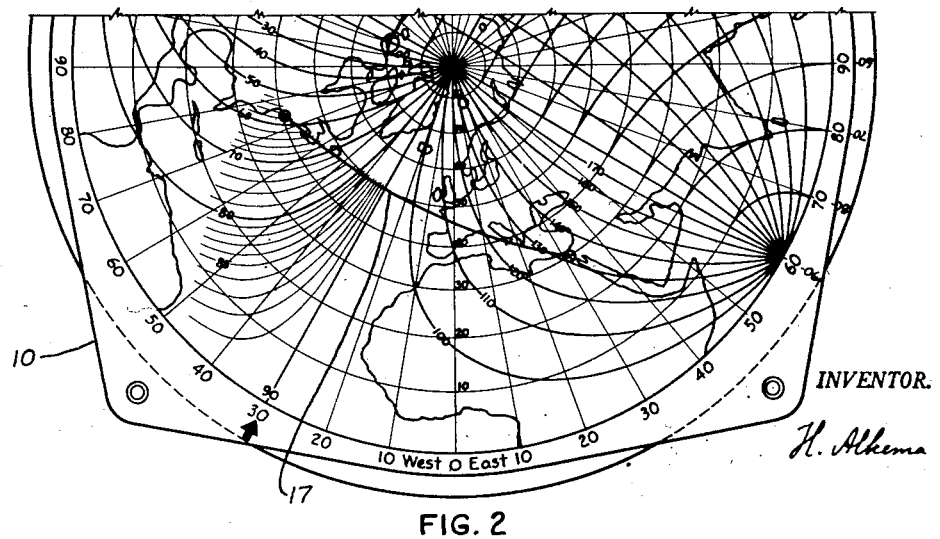
Fig. 2 is in part a view of the same side of the device, showing the previously traced great circle route between New York and Cairo, with the disk rotated through 180°, illustrating how the course or direction at any point of the route is determined at a glance.

Next the disk 13 is rotated until the black arrow 19 which is located diametrically opposite arrow 18 comes where the white arrow was before, namely at longitude 30° west. The result is shown in Fig. 2 where the great circle route 17 is underlain by the other half of disk 13 which will now be described, with reference again to Fig. 5. It is imprinted with a set of curves 20, which have been plotted by connecting points of equal course or direction, and are in a sense isogonic curves. Numerals 27 placed at curves 20 give the course in degrees. Therefore, in Fig. 2 it is seen at a glance that the initial course (at New York) is 57° and that going eastward the course increases gradually so that at longitude 70° W. it is 60°, at 60° W. it is 68°, etc., until at the destination it becomes 131°. It will be noted that the courses indicated are for the west-east travel. For travel in a westerly direction 180° should be added to the readings.

When the points of departure and of destination are both located in the southern hemisphere, the device is used with its southern side uppermost and exactly the same procedure is followed. The reverse side of disk 13, shown in Fig. 6, is almost the exact duplicate of the side described. The curves are the same, also their numeral designations, but the numerals are preferably placed in a different way which is explained below.

When the points of departure and of destination are located in different hemispheres, the following method may be used. A rough estimate is made of the longitude where the equator will be crossed, and disk 13 is rotated until point B (or A) coincides with that longitude. Then, after the device has been turned over, it is noted whether or not the point of destination is on the same great circle as the point of departure. If it is not, for instance if the point of departure is on the curve designated 50° and the point of destination on that of 44°, disk 13 is rotated until the point of departure is on the 47° curve, or the average of the two. The point of destination will then probably be found on the 47° curve on the reverse side. If it is not, a further and lesser adjustment is made. Then, when the disk is in the correct position, the great circle route is traced in pencil as before.

In Figs. 5 and 6 an example is illustrated for a trip from New York to Capetown. Let us assume that it has been determined after one or two trials that the great circle with 47° vertex latitude fits the requirement of passing through the two cities. Point B is found to be at longitude 21° W., which applies also to point B' on the southern side of the device. Then the curve 21 connecting New York with B is traced and, after turning the device over, curve 22 is traced, connecting B' with Capetown. Next the distance is determined which in this case will be the sum of the complements of the two reads, or 63°+50°=113°, which is 113×60=6780 nautical miles.

It should be noted that half circle ACB of disk 13 which contains the great circle curves for the northern side and the corresponding half circle A'C'B' for the southern side are not on the same half of the disk, a result of the fact that the curves on one side are the continuations of those on the other.

The next step again is rotation of disk 13 through 180°, which will make the course for any point of the trip directly readable.

As an alternate for the method described for great circle routes crossing the equator, the following method, which eliminates all trial and error, can be used. The antipodal point of the destination is plotted by longitude and latitude. The great circle passing through this point and the point of departure is located. It will then be found that the continuation of this great circle will pass through the real destination. Thus, in Fig. 5, the antipodal point 23 of Capetown (lat. 34° S., long. 19° E.) will be lat. 34° N. and long. 161° W. The distance from point 23 to New York along dotted line 24 is readily determined and found to be 67°, which simply is the supplement of the great circle distance between New York and Capetown, or 113°, noted herein before If, as sometimes happens, the points of departure and destination are in the same hemisphere and on the same side of the line of vertices, the distance readings should be subtracted instead of added. It is not always possible to find a curve that will pass exactly through the two points which are to be connected. The actual vertex latitude in some particular case may be 49⅓ degrees, for instance, in which case the track is plotted between the two nearest curves and in this case twice as close to the 50° curve as to that of 48°.

It will be understood that although the curves in the drawings are shown at 2° intervals they may instead be spaced at any desired interval as for instance 1° or ½°. The important thing is that it has no effect on the accuracy obtained in determining distances whether the great circle track to be followed is exactly on one of the printed curves or lies between a pair of them, since in each case the track is intersected by the distance curves in the same positive manner.

The distance along any great circle, from the line of vertices to one of the points of convergence is always 90°. Curves of equal distance from the line of vertices are therefore also curves of equal distance from the points of convergence, and are thus easier defined. In the drawings distances are indicated as measured from the vertices, since by this method, in the majority of cases, the distance will be obtained by adding two figures together, which is preferable to subtracting them, but it will be understood that, instead, distances may be indicated as measured in the opposite direction.

In the examples given, latitude, longitude and distance have been rounded off to the nearest degree.

Distance readings should be obtainable with this computer to within perhaps 20 nautical miles, which should be sufficiently accurate for all practical purposes, especially in view of the uncertainties introduced by wind, currents, etc., over the long distances usually covered in great circle sailing. It should be pointed out, however, that even for comparatively small distances, where the rhumb line method normally would be used, this device offers the same quick solution with regard to both distance and course, the latter being picked off by taking the mean between the initial and the final course, or by taking the course at the midpoint of the route. In any and all cases the compass course can be determined to the nearest degree, which amounts to practical accuracy.

In cases where the great circle route would reach too high a latitude at its vertex, a method called "composite sailing" is commonly used, according to which two great circle routes are determined tangent to the limiting parallel, one passing through the point of departure and one through the point of destination. The route will then consist of three portions, the middle portion being formed by a section of the limiting parallel from the first point of tangency to the second. With the device of this invention the solution of this problem is extremely simple, since the great circle to be used is directly known, its vertex latitude being that of the limiting parallel. It is passed first through the point of departure which locates the vertex which becomes the first point of tangency and next it is passed through the point of destination which locates the second point of tangency. The length of the composite route is equal to the sum of just three figures, each directly readable from the graticule.

As will be seen from Figs. 1, 2 and 5, which all represent the northern map, the longitudes are shown along the equator, the east longitudes, 10°, 20°, etc. reading left to right and the west longitudes reading right to left, in the customary manner which is generally used on Mercator and other map projections. They are also placed right side up in conformity with the rule that the north direction points upward. On the southern map the same rules are followed (see Fig. 6).

In the description of disk 13, given above, it was said that the numerals on the south face were placed in a different way from that used on the north face. This means that they are placed with the rule in mind that the north direction always points upward. It will thus be noted that the vertex latitudes 25 of Fig. 5 are placed so that "up," which is equivalent to north, is toward the center, while vertex latitudes 26 of Fig. 6 are placed so that "up" is away from the center of the disk. This rule is also followed in the case of course designations, as a comparison of numerals 27 of Fig. 5 with numerals 28 of Fig. 6 shows.

Fig. 7 is a partial view of disk 13 and offers a method by which distances may be read directly in nautical miles instead of degrees if such should be preferred. Each division here represents 100 miles.

To plot a geographical position, such as the point of departure or destination, or the antipodal point, on one of the transparent maps, disk 13 can be used very efficiently. It is positioned with the line of vertices indicating the longitude and, since this line is provided with a latitude scale, it is a simple matter to plot the given latitude on the map.

As pointed out before, the spacers 12 of Fig. 3 form part of the construction of the device, their function being to keep the transparent maps the correct distance apart for free movement of the disk 13 between them. They are also positioned so that they act as guides to keep the disk properly centered. As an alternate method to achieve correct centering a pin 29 may be used as shown in Fig. 4. It is shown projecting from disk 13, of which it forms an integral part. The corresponding hole in map 11 may be suitably reinforced by means of a transparent ring-shaped reinforcing 30.

Holes 31 may be provided in each of the corners, so the device can be hung up in any position desired, in accordance with the particular geographical area in which the user may be interested at the moment. The position of the meridian of Greenwich may be where shown in Fig. 1 or it may be diagonally located as in Fig. 8, whichever is preferred.

Similarly a projection other than the stereographic may be used, as for instance the equidistant projection. Each of these projections has its peculiar advantages and disadvantages.

A network of meridians and parallels may be imprinted on the map projections as indicated in Figs. 1, 2, 5 and 6. It will be understood, however, that, since it is not needed for plotting, the occurrence of such a network on the map projections is optional.

Herein the word "direction" is used to indicate the angle between the great circle and the meridian, and the curves indicating this angle are referred to as "direction curves." The word "course" is also used occasionally and in the same sense, but only where there can be no doubt as to its intended meaning.

A second form of the invention is also possible. In this form the operation of rotating the disk through 180° is eliminated by omitting from the disk the direction curves, which occur, instead, on an additional removable transparent sheet which may be semicircular in form, and which may be placed over the appropriate map so that its straight direction curve 0°–180° covers the points of convergence on the disk. This sheet is meant to be used only from time to time whenever it is required to determine the course to be steered.

Various other modifications are possible and numerous variations in the details of construction may be made without departing from the scope of the invention as set forth in the appended claims.

I claim:

1. A great circle computer comprising a pair of transparent maps of the earth's surface, one of the said maps being a polar azimuthal projection of the northern hemisphere and the other map being a similar projection of the southern hemisphere and an opaque circular disk having on each of its sides a set of curves converging on two diametrically opposite points at the equator, each curve being a true representation of a great circle on the map with which the set cooperates, the said maps being connected so that longitudes on the one map correspond in position with those on the other map, and the said two points of convergence of the curves on one side of the disk correspond in position with those on the other side, the said disk being adapted to be rotated between the said maps until one of the said curves passes through any two geographical points on the same map between which the great circle route is to be located, or whereby any two points on opposite hemispheres may be visibly connected by a great circle, by rotating the disk until one of the great circle curves on one side of the disk passes through one of the said points on one of the maps, while the corresponding curve on the other side passes through the other point on the other map.

2. A great circle computer as claimed in claim 1, the said disk being adapted to be rotated between the said maps until the two geographical points lying on opposite hemispheres are each positioned between a pair of the said great circle curves so that one of the two curves on the north face of the disk is relatively as close to the northern geographical point as the corresponding curve on the south face is to the southern geographical point.

3. A great circle computer as claimed in claim 1, wherein points of equal great circle distance from the said points of convergence of the great circle curves have been connected by curves forming a set of distance curves intersecting the set of great circle curves on each side of the disk, whereby positive intersections may be obtained between each distance curve and any great circle passing through the two geographical points, and whereby accurate distance readings are made available, whether the required great circle coincides with one of the great circle curves on the disk or is intermediate between a pair of them.

4. A great circle computer as claimed in claim 3, wherein points of equal direction along the great circle curves have been connected by curves and whereby the true course to be steered at any point of the great circle passing through any two geographical points will be indicated by the direction curve intersecting the great circle at that point.

5. A great circle computer as claimed in claim 4, wherein the great circle curves and distance curves are confined to one half of each face of the disk, the said half lying completely on one side of the diameter connecting the said points of convergence of the great circle curves, while each set of direction curves is confined to the complementary half of each face, and whereby any two points on either one of the maps may be connected by a great circle, whereupon, after tracing the great circle route on the map and rotating the disk through 180°, the direction at any point of the route is indicated by the nearest underlying direction curve, while the objectionable feature of having more than two set of curves covering the same area is avoided.

6. A great circle computer as claimed in claim 5, wherein the great circles on one face of the disk are continuations of those on the other face relative to the maps at all times, whereby any two points located on opposite hemispheres may be connected by a great circle in a single setting, traced in part on one of the maps and in part on the other, so that, when the disk is thereupon rotated through 180°, the direction at any point of the route will be indicated by the nearest underlying direction curve.

7. A great circle computer comprising a pair of transparent maps of the earth's surface, one of the said maps being a polar azimuthal projection of the northern hemisphere and the other map being a similar projection of the southern hemisphere and an opaque circular disk having on each of its sides a set of curves converging on two diametrically opposite points at the equator, each curve being a true representation of a great circle on the map with which the set cooperates, the said points of convergence of the great circle curves on each side of the disk coinciding with the same pair of longitudes on both maps at all times, whereby any two points on opposite hemispheres may be connected by a great circle in a single setting, by rotating the disk until one of the curves on one side of the disk passes through one of the said points on one of the maps, while the corresponding curve on the other side passes through the other point on the other map.

8. A great circle computer comprising a transparent polar azimuthal map sheet and a graticule sheet that coincides with at least a portion of the map, said graticule sheet having imprinted thereon a set of curves shaped to correspond with great circles on the area represented by the map and converging on two diametrically opposite points, and a set of distance curves formed by connecting points of equal great circle distance from the points of convergence of the great circles, the said sheets being relatively rotatable about the midpoint between the said points of convergence and the pole at the center of the map, the graticule sheet being also provided with curves connecting points of equal direction along the great circle curves, for indicating the true course to be steered at any point of any great circle route, the great circle curves being confined to one half of the sheet, the curves of equal direction being confined to the other half of the said sheet, the dividing line between the two halves of the graticule sheet being the diameter connecting the points of convergence of the great circle curves, whereby any two points on the map may be connected by a great circle arc of the graticule sheet by rotation of same, and whereupon, after tracing the said arc on the map and rotating the graticule sheet relative to the map through 180°, the direction at any point of the said arc is indicated by the direction curve underlying that point.

9. A great circle computer as claimed in claim 3, having a removable transparent sheet overlying either one of the said maps, said removable sheet having imprinted thereon direction curves converging on three points lying on a straight line, said curves being shaped so that when the sheet is placed over one of the maps with the two outer points of convergence of the direction curves overlying the points of convergence of the great circle curves on the disk, the nearest curve will indicate the direction at any point of a great circle passing through any two geographical points.

10. A great circle computer comprising two transparent maps, one of the northern hemisphere and one of the southern, wherebetween an opaque circular disk is rotatable, said disk having on each of its sides a set of curves converging on two diametrically opposite points, each curve being a true representation of a great circle on the map with which the set cooperates, and a set of curves connecting points of equal distance from the points of convergence of the great circle curves, said great circle curves being confined to one half of each face of the disk, said half lying completely on one side of the one straight great circle curve, the other half of each face having a set of curves which, after rotating the disk through 180°, indicates the direction at any point of any great circle traced on the map from the set of great circle curves prior to the said rotation through 180°, thereby avoiding occurrence of more than two sets of curves within any portion of the disk.

11. A great circle computer including a polar azimuthal map sheet and a graticule sheet coinciding with at least a portion of the map, at least one of said sheets being transparent, the graticule sheet having imprinted thereon a set of curves shaped to correspond with great circles on the area of the earth's surface represented by the map, and a set of distance curves formed by connecting points of equal great circle distance from the points of convergence of the great circles, said sheets being relatively rotatable about the midpoint between said points of convergence and the pole at the center of the map and whereby different great circle curves may be brought into registry with any two points on the map; and a removable transparent overlay sheet, having imprinted thereon direction curves converging on three points lying on a straight line, said curves being shaped so that when said overlay sheet is placed over the other pair of sheets with the two external points of convergence of the direction curves coinciding with the points of convergence of the great circle curves on the graticule sheet, the nearest curve will indicate the direction at any point of any great circle curve on the graticule sheet.

References Cited in the file of this patent
UNITED STATES PATENTS

| | | |
|---|---|---|
| 1,919,222 | Jensen et al. | July 25, 1933 |
| 2,405,601 | Mullendore | Apr. 13, 1946 |
| 2,494,536 | Atwood | Jan. 17, 1950 |